Patented Oct. 17, 1944

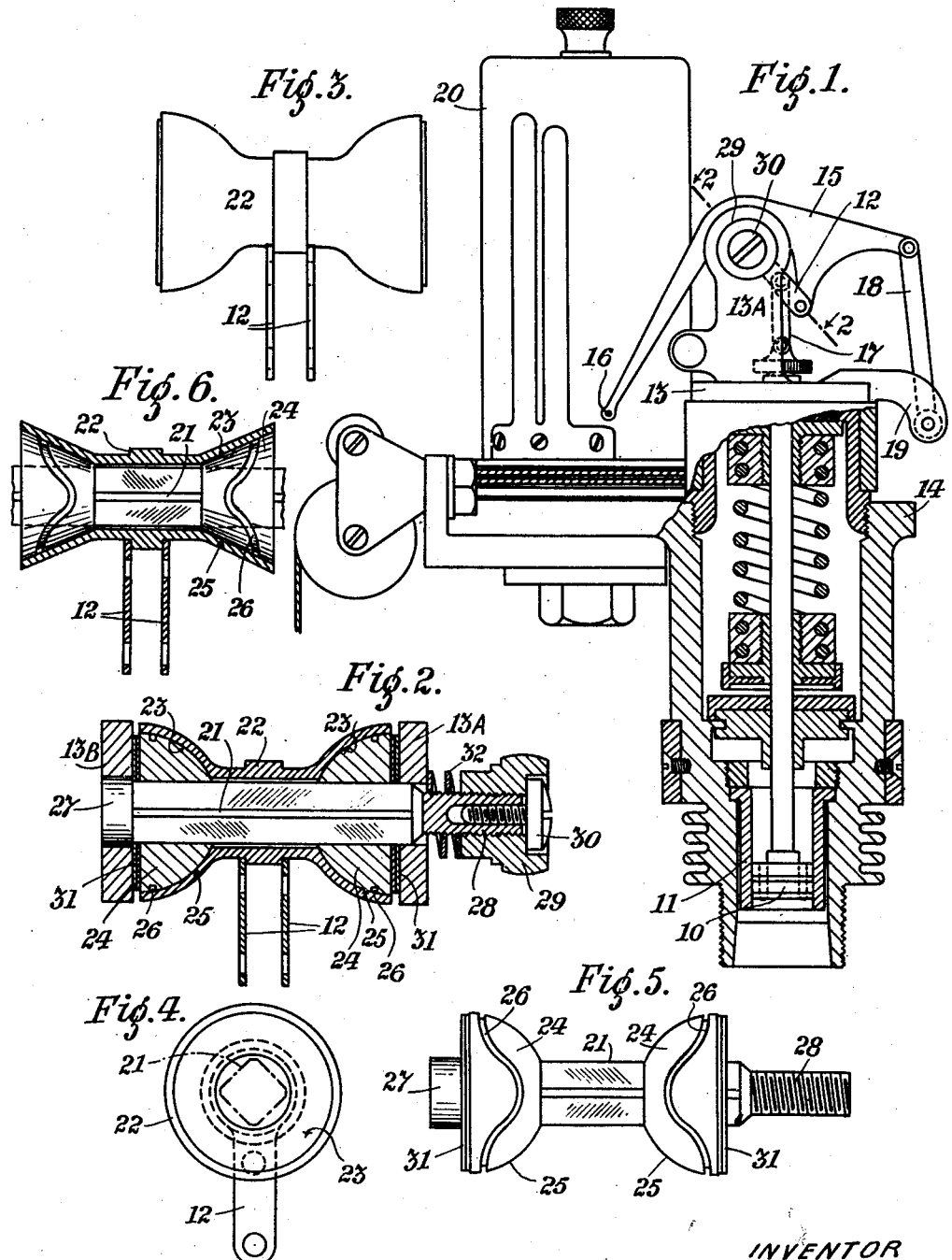

2,360,442

UNITED STATES PATENT OFFICE 2,360,442

PRESSURE-RECORDING INSTRUMENT

Marcus Laurence Oliphant, Barnt Green, near Birmingham, England, assignor to Dobbie McInnes Limited, Glasgow, Scotland Application June 2, 1943, Serial No. 489,418
In Great Britain May 26, 1942

11 Claims. (Cl. 188—130)

This invention relates to pressure-recording instruments adapted for use under conditions in which rapid fluctuations in pressure occur and have to be recorded with accuracy, especially engine indicators for giving a graphic record of variation of pressure in the cylinders of engines, pumps or compressors, or like pressure vessels. In particular, the invention relates to damping means for damping undesired free oscillations which tend to superimpose themselves on the graphic record.

In the United States Patent specification No. 2,308,582 there is described a damping means that utilises viscous friction, a characteristic of which is that with a constant damping resistance the damping force will be proportional to the relative velocity. In the damping means described, there is a bearing for elements of the recording mechanism of a pressure-recording instrument in the operation of which relative movement due to variation in the pressure to be recorded takes place between co-operating surfaces constituting the bearing. The area of said surfaces was to be substantially increased over that which was strictly necessary for guiding, transmitting or supporting purposes and said surfaces were to be spaced from one another at only a minute clearance substantially less than would be provided between relatively movable lubricated surfaces of such instruments in ordinary practice. Further there was to be a viscous fluid in said minute space between the surfaces. It had been ascertained that the area of said surfaces, the clearance therebetween and the viscosity of the fluid should be so correlated that the amount of damping (namely, the ratio $R/Z_r$ in which R is the actual viscous frictional resistance with respect to the recording mechanism and $Z_r$ is the impedance to motion at the resonant frequency of the recording mechanism) has the value 1·4 approximately, at which value high frequency oscillations of the recording mechanism are substantially eliminated and there is no material interference with the formation of a normal record. In one form which the damping means described may take, the co-operating surfaces are coaxial cylinders presented by inner and outer elements which are subjected to relative turning about their common axis.

In order that the desired damping effect will be produced, it is necessary that the minute clearance space between the co-operating surfaces shall be gauged with great precision. Accordingly, the work of machining the cylindrical surfaces of the inner and outer elements with the necessary precision involves difficulties, as such work calls for considerable care and very fine lapping.

Therefore an object of the present invention is to provide in a pressure-recording instrument a damping means in which the surfaces that confine the viscous fluid between them can be finished with the smoothness requisite for bearing surfaces, and with the precision requisite for effective mating between the surfaces, by ordinary machining methods.

Moreover, since almost invariably the damping means will be subjected to varying temperature conditions in use of the instrument and since the viscosity of all known fluids decreases with rise in temperature, it is believed that the materials of which the inner and outer elements are composed must be selected as regards their coefficients of thermal expansion so as to maintain the amount of damping constant. Thus, it is believed to be a practical necessity that the coefficient of the inner element must be greater than that of the outer element, in consequence of which—having regard to the minuteness of the inter-surface space—the danger is present that a comparatively small rise in temperature will cause seizure between the inner and outer elements.

Therefore another object of the present invention is to provide in a pressure-recording instrument a damping means in which the viscous-fluid confining space between co-operating surfaces of relatively turnable elements is regulatable under the control of the user of the instrument.

These objects are attainable by making the co-operating surfaces of flared form, that is to say outwardly spreading form, by using between the surfaces a minutely thin film of viscous fluid and by providing means for relative adjustment between them so as to render the thickness of said film regulatable.

The said object is also attainable by providing two pairs of co-operating surfaces, the pairs flaring, or spreading, in mutually opposite directions, and having two of said surfaces belonging to different pairs adjustable relatively to one another and to the other surfaces so as to regulate both fluid-confining spaces.

Other objects of the invention will be apparent from the following specification and claims.

In the accompanying drawing—

Fig. 1 is a sectional elevation of an engine indicator having one form of damping means according to the invention.

Fig. 2 is a section on line 2—2 of Fig. 1 showing the damping means to a larger scale.

Fig. 3 is an elevation of the female damping elements shown in section in Fig. 2, and Fig. 4 is an end elevation.

Fig. 5 is a view corresponding to Fig. 3 of the male damping elements.

Fig. 6 shows a modification.

In the example shown in the drawing, the damping means is applied to an engine indicator (see Fig. 1) of the type comprising a piston-and-cylinder unit 10, 11 and a parallel-motion mechanism which includes a radius link 12 turnable about an anchorage to a swivel bracket 13 on the stationary frame 14 of the indicator. The parallel-motion mechanism also comprises a lever 15 pin-jointed to the radius link 12 and terminating in the usual marker 16, a link 17 which transmits the piston motion to the radius link, and a link 18 which is pin-jointed to a bracket 19 on the swivel bracket 13 and serves as a moving fulcrum to the lever 15. The marker 16 co-operates with a card-receiving rotatable drum 20.

The aforesaid anchorage on the swivel bracket 13 incorporates the damping means according to the present invention. The anchorage comprises an axle pin 21 (see Figs. 2 and 4) on which fits a sleeve 22 constituting the boss of the radius link 12. The pin 21 and the sleeve 22 are respectively provided with the co-operating bearing surfaces between which, in use of the instrument, minutely thin films of viscous fluid will exercise the desired damping effect on the movement of the working parts of the indicator.

The central body of the sleeve 22 is cylindrical. The sleeve flares or spreads open at both ends, which present female surfaces 23. In the example shown, the surfaces 23 are concavely part-spherical, their axis of curvature being the same as the axis of the pin 16. It will be apparent however that the surfaces 23 may flare or spread otherwise, for instance by tapering conically. The pin 21 (see Figs. 2 and 4) is fitted with two elements 24 which present male surfaces 25, which face towards one another and which are convexly part-spherical, being made to mate or conform precisely with the female surfaces 23. The elements 24 are axially slidable on the pin 21 but are restrained against relative rotational movement by flats formed in the elements and on the pin; that is to say, the main body of the pin 21 has the squared cross-section indicated in dot-dash outline in Fig. 4 and the holes through the elements 24 have the same form. The arrangement and sizes of the parts are such that there is a substantial annular clearance between the sleeve 22 and the pin 21, whereas the mating flared or spreading surfaces 23, 25 fit closely into one another.

A sinuous oil-trapping groove 26 is formed around each male surface 25. The shape of the groove is designed to avoid local wear or marking of the bearing surfaces.

The pin 21 has a cylindrical head 27 at one end and has a screwed opposite end 28; and a regulating thumb-nut 29 is provided on the screwed end, being secured thereto by a screw 30. The head of the pin and its body, respectively, are exact sliding fits in two stanchions 13A, 13B of the swivel bracket 13, the damping surface elements 22, 24 being between these stanchions and the nut 29 being outside. Plain washers 31 are interposed between the male-surface elements 22 and the stanchions, and a spring washer 32 is interposed between the thumb-nut and the adjacent stanchion. The arrangement is such that the setting of the thumb-nut 29 determines the pressure with which the mating surfaces 23, 25 bear against one another and therefore the thickness of the fluid films.

The clearance spaces between the pairs of mating surfaces 23, 25 are filled with a film of liquid of high viscosity and low temperature-viscosity coefficient, each film therefore having the same flared or spreading form as the mating surfaces that confine it. The thickness of the film of liquid is controlled by the thumb-nut. A suitable liquid is found to be the petroleum product known by the trade-mark name "Paratone", or a mixture of "Paratone" and Pennsylvania low cold test oil. "Paratone" is a concentrate containing 20% to 25% of 15,000 molecular weight polybutene in a light well-refined lubricating oil and having a viscosity at 100° F. of about 105 poises. "Paratone" is used for blending with motor oils to improve their viscosity-temperature characteristics.

In operation, an indicator diagram may be obtained with the thumb-nut 29 slackened back say to the limit position in which it is shown in Fig. 2. If the peak or expansion line of the indicator diagram, as traced by the marker 16, shows that the moving parts of the indicator are subject to free oscillation, the thumb-nut is tightened to reduce the thickness of the oil films between the pairs of surfaces 23, 25. Tightening is repeated, or slackening is effected, until finally a diagram is obtained from which all free oscillations have just disappeared. In this way the instrument is set for taking records at about the temperature of the damping means.

If there is any marked change in the temperature of the damping means, a readjustment of the thumb-screw 29 is made to compensate for the changed conditions.

In view of the provision for adjustment under the control of the user of the instrument of the thickness of the minute viscous fluid films, provision for automatic regulation of said thickness may be omitted in the manufacture of the instrument. Therefore, ferrous and non-ferrous metals may be used at choice for the manufacture of the elements concerned, namely, the sleeve 22 and the male-surface elements 24. For instance, the sleeve 22 may be made of phosphor bronze, and the elements 24 of case hardened mild steel; or vice versa.

However, provision may be made for automatic temperature compensation by appropriate selection of the materials of which the sleeve 22 and the male-surface elements 24 are made as regards coefficient of thermal expansion. For example, the elements 42 may be made of a material such as austenitic alloy steel or aluminium or an aluminium alloy having a high coefficient and the sleeve 12 may be made of a material such as "Invar" which has a low coefficient.

It will be manifest that, by virtue of the provision for regulation of the inter-surface clearances, that is between the mating surfaces 23 and 25, substantial tolerance is allowable in the machining of these surfaces. The surfaces may flare or spread at any angle up to the limit angle of ninety degrees to the axis, that is, they may be presented by flat discs. Thus, need for great precision as regards the relative diametral sizes of these surfaces is avoided. Moreover, the damping means can be regulated to suit prevailing conditions whenever the instrument has to be used; and so danger of seizure between the surfaces due to excessive rise in temperature is minimised or removed.

As previously stated herein, the flared or spreading surfaces instead of being part-spherical as shown in Figs. 2 to 5 may be conically tapered. Such a formation is shown by Fig. 6. Although the tapered formation is preferable theoretically, because the oil film is or may be of uniform thickness throughout, the part-spherical surfaces are found in practice to be accurately mated more simply.

It will be manifest from the foregoing specification, including the reference to the United States Patent specification No. 2,308,582, that the co-operating parts 22 and 24 must be machined so that they present to one another finished surfaces, that is surfaces having the high finish requisite for bearing surfaces in an efficient instrument; and it is in this sense that the word "finished" is used in the following claims.

It will also be manifest that as the minute film of viscous fluid must be maintained for long periods the surfaces confining the fluid must be impervious to it, that is said surfaces must not absorb the fluid or otherwise use it up in the work of the instrument; and it is in this sense that the word "impervious" is used in the following claims.

I claim:

1. In a pressure-recording instrument, damping means comprising relatively turnable elements, finished impervious surfaces on said elements respectively of flared or spreading formation, said surfaces co-operating to provide a viscous-fluid-confining space, a minutely thin film of viscous fluid with the same flared or spreading formation between said surfaces to exercise a viscous frictional effect thereon, and means for effecting relative adjustment between said elements to regulate the thickness of said film.

2. In a pressure-recording instrument, damping means comprising elements relatively turnable about an axis, finished impervious surfaces on said elements respectively of part-spherical formation about said axis, said surfaces co-operating to provide a viscous-fluid-confining space, a minutely thin film of viscous fluid with the same part-spherical formation between said surfaces to exercise a viscous frictional effect and a screw-and-spring device for effecting an adjustable axial pressure between said elements to regulate the thickness of the fluid film in said space.

3. In a pressure-recording instrument, damping means comprising elements relatively turnable about an axis, finished impervious surfaces on said elements respectively of conically tapered formation about said axis, said surfaces co-operating to provide a viscous-fluid-confining space, a minutely thin film of viscous fluid with the same conically tapered formation between said surfaces and a screw-and-spring device for effecting an adjustable axial pressure between said elements to regulate the thickness of the fluid film in said space.

4. In a pressure-recording instrument, damping means comprising relatively turnable elements arranged in two opposed pairs, finished impervious surfaces on said pairs of elements respectively of flared or spreading formation, the surfaces of one pair of elements flaring or spreading in the opposite direction to those of the other pair of elements and each pair of said surfaces co-operating to provide a viscous-fluid-confining space, a minutely thin film of viscous fluid with the same flaring or spreading formation in each said space to exercise a viscous frictional effect on said surfaces, and means for effecting relative adjustment between corresponding elements of different pairs to regulate the thickness of each said film.

5. In a pressure-recording instrument, damping means comprising elements relatively turnable about an axis and arranged in two opposed pairs, finished impervious surfaces on said pairs of elements respectively of part-spherical formation about said axis, the surfaces of one pair of elements flaring or spreading in the opposite direction to those of the other pair of elements and each pair of said surfaces co-operating to provide a viscous-fluid-confining space, a minutely thin film of viscous fluid with the same part-spherical formation in each said space to exercise a viscous frictional effect on said surfaces and means for effecting relative axial adjustment between corresponding elements of different pairs to regulate the thickness of each said film.

6. In a pressure-recording instrument, damping means comprising elements relatively turnable about an axis and arranged in two opposed pairs, finished impervious surfaces on said pairs of elements respectively of conically tapered formation about said axis, the surfaces of one pair of elements flaring or spreading in the opposite direction to those of the other pair of elements and each pair of said surfaces co-operating to provide a viscous-fluid-confining space, a minutely thin film of viscous fluid with the same conically tapered formation in each said space to exercise a viscous frictional effect on said surfaces and means for effecting relative axial adjustment between corresponding elements of different pairs to regulate the thickness of each said film.

7. In a pressure-recording instrument including frame stanchions and a movable linkage, damping means comprising an axle supported by said stanchions and attached to one of them, two elements disposed between said stanchions on said axle respectively having flared or spreading male finished impervious surfaces which face one another, said elements being axially adjustable one in relation to the other, a turnable sleeve disposed on said axle between said stanchions and connected to said linkage to turn proportionately to the movement thereof, said sleeve having flared or spreading female finished impervious surfaces which face away from one another and which mate with said male surfaces to provide spaces of flared or spreading formation between the mating surfaces, minutely thin films of viscous fluid of the same flared or spreading formation in said spaces to exercise a viscous frictional effect on movement of said linkage, and a screw-and-spring device applied to said axle and said one of the stanchions for pressing said male surfaces towards said female surfaces to an adjustable extent and so regulating the thickness of said films.

8. In a pressure-recording instrument including a frame and a movable linkage, damping means comprising an axle supported on said frame, two elements on said axle respectively having flared or spreading male finished impervious surfaces which face one another, said elements being axially adjustable one in relation to the other, a turnable sleeve on said axle connected to said linkage to turn proportionately to the movement thereof, said sleeve having flared or spreading female finished impervious surfaces which face away from one another and which mate with said male surfaces to provide spaces of flared or spreading formation between the mating surfaces, minutely thin films of viscous fluid of the same flared or spreading formation in said spaces to exercise a viscous frictional effect on movement of said linkage, and a screw device applied to said axle for adjusting movement of said linkage, and a screw device applied to said axle for adjusting the axial distance between said male-surface elements and so regulating the thickness of said films.

9. In a pressure-recording instrument including a frame and a movable linkage, damping means comprising an axle supported on said frame, an element on said axle having a flared or spreading male surface, a turnable element on said axle connected to said linkage to turn proportionately to the movement thereof, said turnable element having a flared or spreading female finished impervious surface which mates with said male surface to provide a space of flared or spreading formation between the mating surfaces, a minutely thin film of viscous fluid of the same flared or spreading formation in said space exercising a viscous frictional effect on movement of said linkage, said elements being axially adjustable one in relation to the other, and a screw device applied to said axle for adjusting the axial relationship between said elements and so regulating the thickness of said film.

10. In a pressure-recording instrument including frame stanchions and a movable linkage, damping means comprising an axle supported by said stanchions and attached to one of them, two elements disposed between said stanchions on said axle respectively having flared or spreading finished impervious surfaces which face one another, said elements being axially adjustable one in relation to the other, a turnable sleeve disposed on said axle between said stanchions and connected to said linkage to turn proportionately to the movement thereof, said sleeve having finished impervious surfaces which face away from one another and which mate with said first-mentioned surfaces to provide spaces of flared or spreading formation between the mating surfaces, minutely thin films of viscous fluid of the same flared or spreading formation in said spaces to exercise a viscous frictional effect on movement of said linkage, and means applied to said axle and said one of the stanchions for pressing said first-mentioned surfaces towards said second-mentioned surfaces to an adjustable extent and so regulating the thickness of said films.

11. A pressure-recording instrument including a frame and a movable linkage and having damping means which comprise an axle supported on said frame, an element on said axle having a flared or spreading finished impervious surface, a turnable element on said axle connected to said linkage to turn proportionately to the movement thereof, said turnable element also having a finished impervious surface which mates with said first-mentioned surface to provide a space of flared or spreading formation between the mating surfaces, a minutely thin film of viscous fluid of the same flared or spreading formation in said space exercising a viscous frictional effect on movement of said linkage, said elements being axially adjustable one in relation to the other, and a screw-and-spring device applied to said axle for adjusting the axial relationship between said elements and so regulating the thickness of said film.

MARCUS LAURENCE OLIPHANT.